(12) United States Patent
Verbowski

(10) Patent No.: US 8,146,934 B2
(45) Date of Patent: Apr. 3, 2012

(54) SUSPENSION LINK

(76) Inventor: Larry J. Verbowski, Bay City, MI (US)

( * ) Notice: Subject to any disclaimer, the term of this patent is extended or adjusted under 35 U.S.C. 154(b) by 626 days.

(21) Appl. No.: 12/183,415

(22) Filed: Jul. 31, 2008

(65) Prior Publication Data

US 2009/0031849 A1 Feb. 5, 2009

Related U.S. Application Data

(60) Provisional application No. 60/952,973, filed on Jul. 31, 2007.

(51) Int. Cl.
*B60G 11/22* (2006.01)

(52) U.S. Cl. ........... 280/124.177; 280/124.152; 411/383

(58) Field of Classification Search ............. 280/124.1, 280/124.152, 124.177; 411/383, 384, 389
See application file for complete search history.

(56) References Cited

U.S. PATENT DOCUMENTS

| | | |
|---|---|---|
| 1,102,776 A | 7/1914 | McCanna |
| 1,682,786 A | 9/1928 | Harris |
| 2,169,969 A | 8/1939 | Allison |
| 2,544,582 A | 3/1951 | Booth |
| 2,691,520 A | 10/1954 | Joseph |
| 2,771,312 A | 11/1956 | Thiry |
| 2,819,105 A | 1/1958 | Behnke |
| 3,052,130 A | 9/1962 | Kellogg et al. |
| 4,113,278 A | 9/1978 | Rissberger |
| 4,944,523 A | 7/1990 | Hardy, Jr. et al. |
| 5,064,216 A * | 11/1991 | Hynds .................. 280/124.152 |
| 5,449,193 A | 9/1995 | Rivard et al. |
| 5,551,722 A * | 9/1996 | Schwartz et al. ...... 280/124.152 |
| 5,704,631 A | 1/1998 | Sparks et al. |
| 5,707,073 A | 1/1998 | Stuker et al. |
| 5,794,965 A | 8/1998 | Stuker et al. |
| 6,019,383 A | 2/2000 | Kociba et al. |
| 6,402,171 B1 | 6/2002 | Nickerson et al. |
| 6,572,127 B2 | 6/2003 | Pazdirek |
| 7,178,815 B2 * | 2/2007 | Cai et al. ................ 280/124.107 |
| 7,258,504 B2 * | 8/2007 | Griffin ......................... 403/150 |
| 7,261,306 B2 * | 8/2007 | Trotter ................... 280/124.106 |
| 7,699,570 B2 * | 4/2010 | Trotter et al. ................ 411/533 |
| 2003/0127818 A1 | 7/2003 | Pazdirek |

* cited by examiner

*Primary Examiner* — Toan To
(74) *Attorney, Agent, or Firm* — Robert L. McKellar; McKellar IP Law, PLLC

(57) ABSTRACT

A suspension link assembly is provided. The link assembly includes a link member having a head portion and a shank. The head portion has a concave surface. The head portion further includes a convex surface. At least one bushing is provided. The bushing has convex and concave surfaces for respectively engaging the concave and convex surfaces of the head portion. A tapered aperture extends through the head portion from the convex surface to the concave surface.

16 Claims, 4 Drawing Sheets

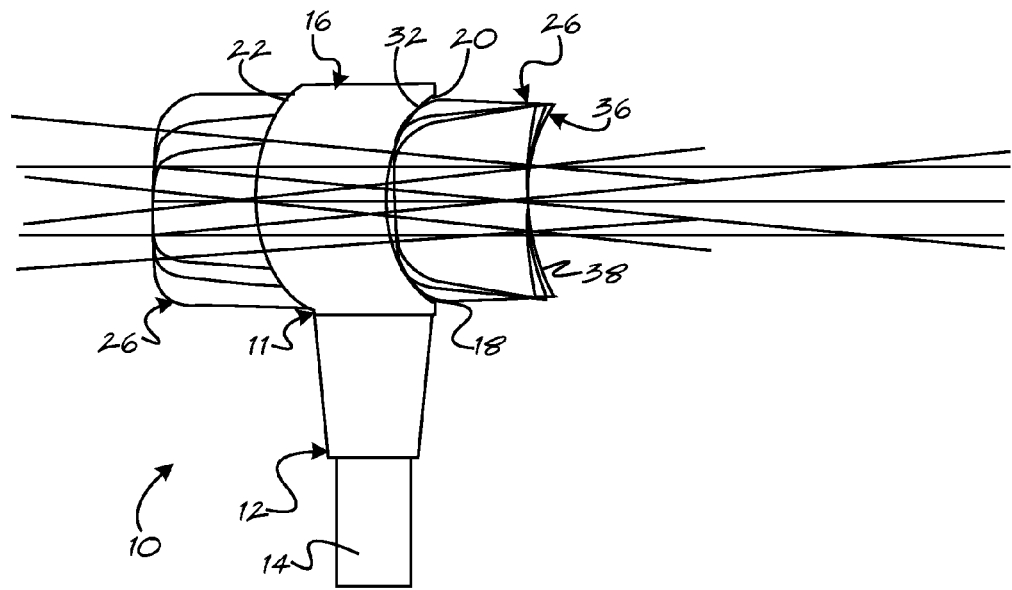
FIG_ 3
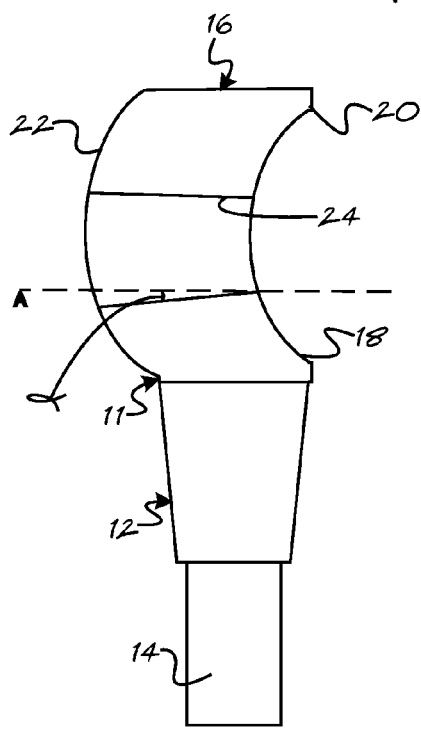
FIG_ 4
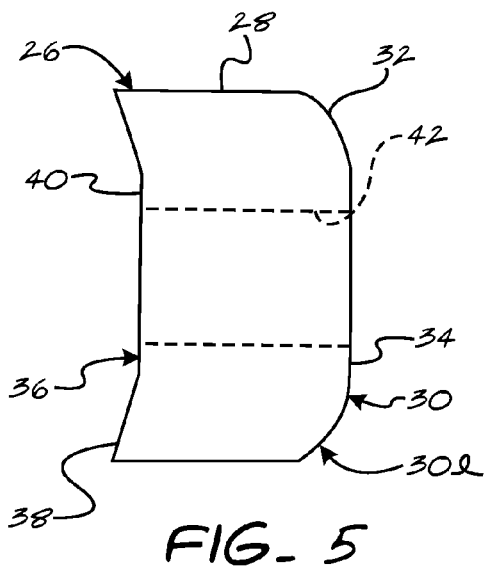
FIG_ 5

SUSPENSION LINK

CROSS-REFERENCE TO RELATED APPLICATION

The instant application claims priority to U.S. Provisional Application Ser. No. 60/952,973 filed 31 Jul. 2007, the entire specification of which is expressly incorporated herein.

FIELD OF THE INVENTION

The present invention relates generally relates to a suspension link. More specifically, the present invention relates to an automotive sway bar stabilizer link.

BACKGROUND OF THE INVENTION

Suspension sway bar systems are designed to absorb road shock and variable dynamic loads which, if not controlled, lead to poor handling and unsafe vehicle performance. Suspension components are subjected to harsh environments such as moisture, salt, road debris and dirt, all of which have detrimental effects on each of the individual components. Currently, different designs are used to provide a stabilizer link. A common design is a ball-type design which comprises a polished steel ball surrounded by a steel liner. One such ball joint type component is shown in U.S. Pat. No. 6,019,383.

This type of design is advantageous in that it provides rotatability of the ball and angular movement of the through-bolt part. Such a design has many deficiencies such as minimal preload on the steel ball, steel-to-steel contact, along with no provision for lubrication as a means to extend life, and poor sealing of internal parts by a seal or a boot. Intrusion of foreign material causes rust and degradation of the internal parts resulting in accelerated wear, noise and excessive clearance which leads to reduced vehicle control and the need for a complete replacement at substantial cost. It is, therefore, desirable to provide a link having an alternative design that reduces the deficiencies of the prior art designs.

SUMMARY OF THE INVENTION

According to an embodiment of the present invention, there is provided a suspension link assembly. The suspension link assembly comprises a link member having a shank portion and a head portion having an inwardly directed surface. The head portion further has an aperture therethrough. The link assembly further includes at least one bushing. The bushing has least a surface to contact the inwardly directed surface of the head portion.

According to another embodiment of the present invention, there is provided a suspension link assembly. The suspension link assembly comprises a link member having a shank portion and a head portion. The head portion further has an inwardly directed concave surface, a convex surface and an aperture extending between the concave surface and the convex surface. The link assembly further includes at least one bushing having an aperture therethrough and adapted to engage at least one of the concave and convex surfaces.

According to another embodiment of the present invention, a suspension link assembly is provided. The suspension link assembly comprises a bushing having a generally cylindrical body portion. The suspension link assembly further comprises a first end surface having a generally convex portion, a second end surface having a generally concave portion, and an aperture extending through said cylindrical body portion from the first end surface to the second end surface.

BRIEF DESCRIPTION OF THE DRAWINGS

The present invention will become more fully understood from the detailed description and the accompanying drawings, wherein:

FIG. 3 is a side view showing various positions of the embodiment of FIG. 1;

FIG. 4 is a cross-sectional view of one component of the embodiment of FIG. 1;

FIG. 5 is a side view of one component the embodiment of FIG. 1;

DETAILED DESCRIPTION OF THE PREFERRED EMBODIMENTS

Figure 1:
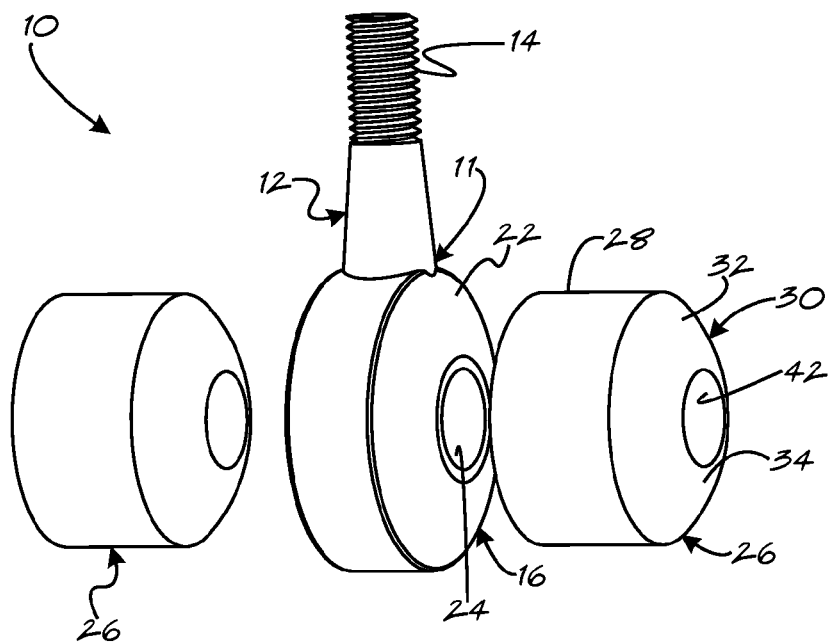
FIG. 1 is an exploded perspective view of an exemplary suspension link in accordance with one embodiment of the present invention.
Figure 2:
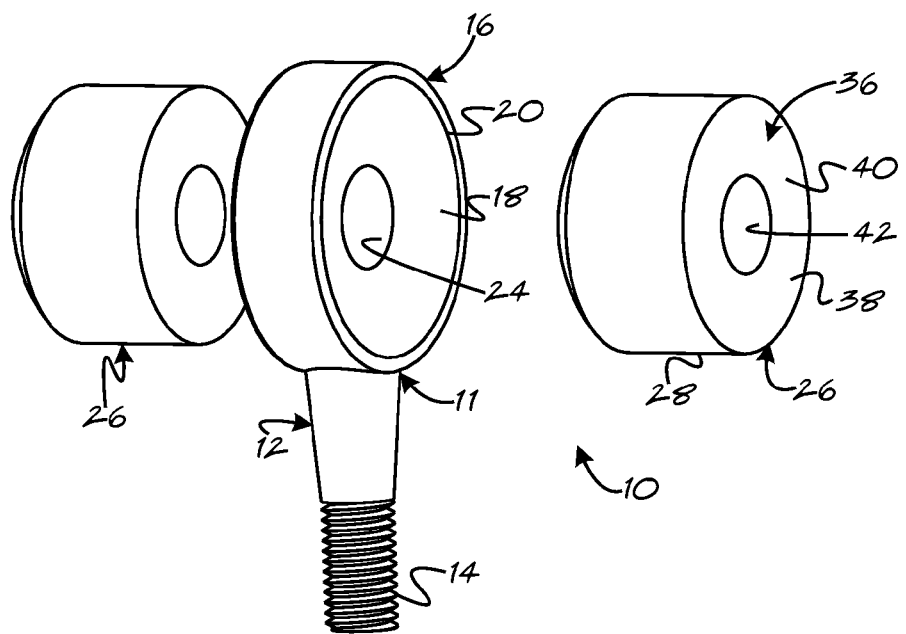
FIG. 2 is an exploded perspective view of link of FIG. 1.

As seen in FIGS. 1 and 2, a suspension link assembly is generally shown at 10. The link assembly 10 is shown from different perspectives (angles) in FIGS. 1 and 2. The suspension link assembly 10 comprises a link member generally indicated at 11. The link member 11 may preferably be made of metal and most preferably steel. The link member 11 may have a shank portion generally indicated at 12. The shank portion 12 may include a threaded segment 14. The threaded segment 14 is for connecting the link assembly 10 with another component in the suspension system (not shown) as is well-known. The shank portion 12 may take any suitable configuration.

The link member 11 further includes a head portion generally indicated at 16. The head portion 16 may be fixedly secured to the shank portion 12 and, may preferably be integrally formed therewith. Thus, the head portion 16 and shank portion 12 may be formed as one piece. Alternatively, the head portion 16 and shank portion 12 may be formed independently and secured together. The head portion has a generally circular cross-section.

The head portion 16 may have an inwardly directed concave surface 18 (FIGS. 2 and 4). The concave surface 18 may form a portion of a sphere. Specifically, the concave surface 18 approaches an inner segment of a sphere. The concave surface 18 may be bounded by an annular lip 20. The annular 20 extends outwardly from the concave surface 18.

The head portion 16 may further include a convex surface 22 (FIGS. 1 and 4). The convex surface 22 is opposite the concave surface 18. The convex surface 22 may comprise a portion of a sphere. More specifically, the convex surface approaches the external surface of a sphere.

The head portion 16 may further include an aperture 24 therethrough. The aperture extends from the convex surface 22 through the head portion 16 and through the concave surface 18. As best seen in FIGS. 3 and 4, the aperture 24 may taper inwardly from the convex surface 22 to the concave surface 18 at angle a from line A. Line A is perpendicular to the longitudinal axis of shaft 12. In one embodiment, the aperture 24 may be tapered between about 1 degree and about 20 degrees and most preferably about 11 degrees from the concave surface 18 to the convex surface 22 as shown in FIG. 3. Notwithstanding the description of the foregoing embodiment, it will be appreciated that any suitable angle a may be used, that provides suitable clearance for the throughbolt angle. This tapering of the aperture allows for angular movement of a throughbolt (not shown). More specifically, a throughbolt (not shown) may extend through the aperture 24. By having the angular aperture 24, the throughbolt is allowed to be positioned in various angular positions relative to head portion 16. Various angular positions are shown, for example, in FIG. 3. The use of a tapering aperture 24 is beneficial in that it allows for use of the link in connection with various suspension assemblies. Sway bar link assemblies are used to make the connection from the sway bar to the suspension often at angles which, when the link assembly 10 is secured, can cause uneven compression on the link assembly 10. By utilizing an aperture 24 that allows for relative angular movement of the throughbolt (not shown), allows to compensate for suspension variations. It also helps to align the sway bar to the suspension arm or other contact point and minimize uneven compression of the suspension link assembly 10.

The suspension link assembly 10 further comprises at least one bushing generally indicated at 26. The bushing 26 comprises a body portion 28. The body portion 28 may have a generally circular cross-section. The body portion 28 therefore has a generally cylindrical shape. As best seen in FIGS. 1 and 5, the bushing has a convex surface 30 on one end of the body portion 28. The convex surface 30 has a generally spherical portion 32 adjacent the peripheral edge of the body portion 28 and a generally flat portion 34. The generally flat portion 34 is intermediate the annular spherical portion 32. The generally flat portion 34 provides a surface to receive the head of a throughbolt (not shown).

The body portion 28 may further include a concave surface 36 (FIGS. 2 and 5). The concave surface 36 is opposite the convex surface 30. The concave surface 36 may include a generally spherical portion 38 about the peripheral edge of the body portion 28 and a generally flat portion 40. The generally flat portion 40 is intermediate the generally spherical portion 38.

An aperture 42 may extend through the body portion 28 from the convex surface 30 to the concave surface 36. The aperture 42 may preferably be generally cylindrical. In the most preferred embodiment, the aperture extends from the generally flat portion 34 of the convex surface 30 through the body portion 28 to the generally flat portion 40 of the concave surface 36. The aperture 42 may receive a throughbolt (not shown).

In one embodiment, as shown in FIGS. 1 and 2, the suspension link assembly 10 may include one link member 11 and two bushings 26. One of the bushings 26 is adapted to engage the convex surface 22 of the head portion 16. One of the bushings 26 is adapted to engage the concave surface 18 of the head portion 16. More specifically, the concave surface 36 of one bushing 26 is adapted to engage the convex surface 22 of the head portion 16. Similarly, the convex surface 30 of one bushing 26 is adapted to engage the concave surface 18 of the head portion 16. A throughbolt may pass through the aperture 24 of the bushing 26, through the aperture 24 of the head portion 16 and through the aperture 42 of the other bushing 26. The throughbolt (not shown) is adapted to connect the link assembly 10 with the vehicle suspension (not shown).

The convex surface 30 of the bushing 26 and more particularly, the generally spherical portion 32 thereof may be adapted to approximate the concave surface 18 of the head portion 16. Similarly, the concave surface 36 of the bushing 26 and more specifically, the generally spherical portion 38 thereof, may be adapted to approximate the convex surface 22 of the head portion 16.

By utilizing generally matching or mating concave and convex surfaces, the bushings 26 can move within the spherical concave and convex segments of the head portion and become self-aligning when installed. The use of the generally spherical concave 18 and convex 22 surfaces in the head portion allows for rotational movement through approximately 360° of the link member 11 and the use of the angular aperture 24 allows for angular alignment. This design approximates that of a prior art style ball design. FIG. 3 shows the bushings 26 in various angular positions relative to the link member 11.

While it is most preferred that two bushings 26 be used, in the manner described above, it will be appreciated that in certain applications, only one bushing 26 may be required. The bushing may contact either the convex surface 22 or concave surface 18 of the head portion 16, depending on the application. If the bushing 26 contacts the convex surface 22 of the head portion 16, then it is arranged so the concave surface 36 of the bushing 26 contacts the convex surface 22, in the manner described above. Similarly, if the bushing 26 contacts the concave surface 18 of the head portion 16, then it is arranged so the convex surface 30 of the bushing 26 contact the concave surface 18.

The bushings 26 are preferably constructed having the same dimensions so that they can either be used to contact the concave surface 18 or convex surface 22 of the head portion 16. Thus, the bushings 26 are interchangeable. It will be appreciated, however, that the bushings 26 may be of different dimensions for certain applications.

The bushings 26 may be elastomeric. Specifically, the bushings may comprise poured urethane. It will be appreciated that any suitable material may be used for the bushing. Other polymeric or rubber materials may be suitable. In some embodiments, such as those shown in the Figures, it is preferred that the concave 36 and convex 30 surfaces of the bushing be relatively smooth. In some embodiments it is preferred that the bushings have a durometer of between about 45 and about 90 on the Shore A scale. It will be appreciated that any suitable hardness may be used. The durometer and size of the bushings 26 may be adjusted to optimize the performance of the link assembly 10.

The bushings 26 may be continually preloaded by a throughbolt (not shown) to absorb and dampen various suspension impact loads. Further, by using an elastomeric bushing 26 adjacent a metal link member 11, the design requires no lubrication and provides relatively quiet operation as compared with previous ball type linkage assemblies. The constant preload absorbs impact loads and minimizes any clearance between the bushings 26, link member 11 and other suspension components to which the link assembly 10 may be secured. The bushings 26 may contact the other suspension components (not shown) to which the link assembly 10 may be secured.

Using a simple throughbolt through the bushings 26 and the link member 11 makes the link assembly 10 easily rebuildable by simply removing the throughbolt and replacing the bushings 26. The throughbolt (not shown) can then be reinserted to attach the link assembly 10 with the vehicle suspension.

Figure 6:
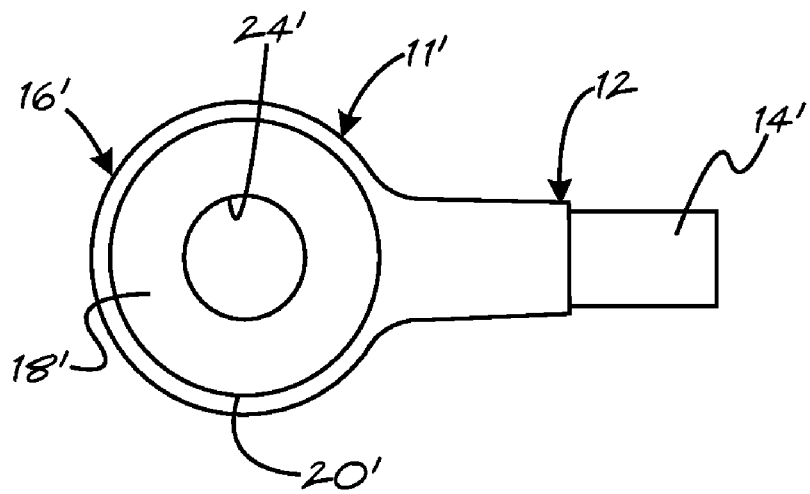
FIG. 6 is a top view of an alternate embodiment of the link member.

FIG. 6 is a top view of an alternate embodiment. As shown in FIG. 6, a link member for use in a suspension link assembly is generally indicated at 11'. The link member 11' may preferably be made of metal and most preferably steel. The link member 11' may have a shank portion generally indicated at 12'. The shank portion 12' may include a threaded segment 14'. The threaded segment 14' is for connecting the link assembly with another component in the suspension system (not shown) as is well-known. The shank portion may take any suitable configuration.

The link member 11' further includes a head portion generally indicated at 16'. The head portion 16' may be fixedly secured to the shank portion 12' and, may preferably be integrally formed therewith. Thus, the head portion 16' and shank portion 12' may be formed as one piece. Alternatively, the head portion 16' and shank portion 12' may be formed independently and secured together. The head portion 16' has a generally circular cross-section.

Figure 7:
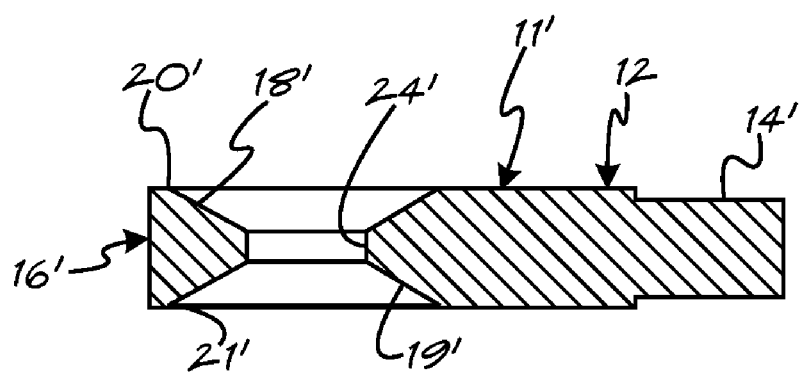
FIG. 7 is a cross-sectional view of the embodiment of FIG. 6.

The head portion 16' may have an inwardly directed surface 18' (FIG. 7). The inwardly surface 18' may form a portion of a cone. Specifically, the inwardly directed surface 18' may be frustoconical. The inwardly directed surface 18' may be bounded by an annular lip 20'.

The head portion 16' may also include a second inwardly directed surface 19' opposite to the inwardly directed surface 18'. Second inwardly directed surface 19' may form a portion of a cone. Specifically, the second inwardly directed surface 19' may be generally frustoconical. The second inwardly directed surface 19' may be bounded by an annular lip 21'. While the inwardly directed surfaces 18', 19' are shown to be frustoconical, it will be appreciated that they can take any suitable geometric configuration. Further, while two inwardly directed surfaces 18', 19' are shown on opposite sides of the link member 11', it will be appreciated that only one inwardly directed surface 18' may be used. In such a case, the opposite side of the link member 11' can take any suitable geometric configuration.

The head portion 16' may further include an aperture 24' extending from the inwardly directed surface 18'. The aperture 24' is for allowing a throughbolt (not shown) to pass therethrough. The aperture 24' may extend between the inwardly directed surface 18' and the second inwardly directed surface 19'.

The walls of one or more of the surfaces 18', 19' are preferably generally frustoconical and may allow for angular surface for movement of a throughbolt, as described above. This allows a throughbolt to have angular movement relative to the link member 11'. The alternate link assembly, including link member 11' may include at least one bushing (not shown in FIG. 7). The bushing may have contoured surfaces of the type described above. Alternative to the concave and convex surfaces as described above, the bushing, for any embodiment described herein, may have frustoconical end surfaces adapted to engage the inwardly directed surfaces 18' or 19'. Still further, the bushings, for any embodiment described herein, may simply be cylindrical, with flat end surfaces as opposed to the concave, convex or frustoconical surfaces described above. Similarly, the bushings may be generally cylindrical, having one generally flat end surface and one contoured end surface. The body of the bushing may also have a shape other than cylindrical. It will be appreciated that the bushing, for any embodiment described herein, can have any geometric configuration within the scope of the present invention.

The link assembly 11' may include two bushings. One bushing can be place on each side of the head portion 16' such that one bushing can contact each of the inwardly directed surfaces 18', 19'.

The bushings may be elastomeric. Specifically, the bushings may comprise poured urethane. It will be appreciated that any suitable material may be used for the bushing. Other polymeric or rubber materials may be suitable. In some embodiments it is preferred that the bushings have a durometer of between about 45 and about 90 on the Shore A scale. It will be appreciated that any suitable hardness may be used. The durometer and size and shape of the bushings may be adjusted to optimize the performance of the link assembly.

The bushings may be continually preloaded by a throughbolt (not shown) to absorb and dampen various suspension impact loads. Further, by using an elastomeric bushing adjacent a metal link member 11', the design requires no lubrication and provides relatively quiet operation as compared with previous ball type linkage assemblies. The constant preload absorbs impact loads and minimized any clearance between the bushings, link member 11' and other suspension components to which the link assembly may be secured.

Using a simple throughbolt through the bushings and the link member 11' makes the link assembly easily rebuildable by simply removing the throughbolt and replacing the bushings. The throughbolt (not shown) can then be reinserted to attach the link assembly 10 with the vehicle suspension.

Figure 8:
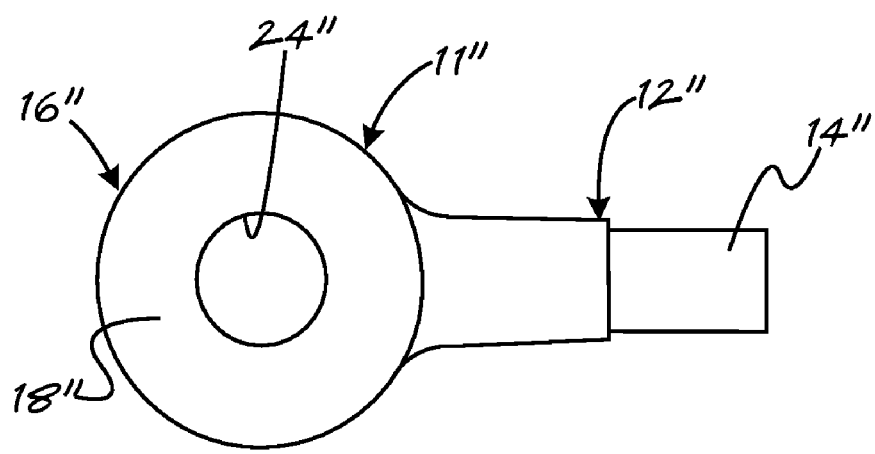
FIG. 8 is a top view of an alternate embodiment of the link member.

FIG. 8 is a top view of an alternate embodiment. As shown in FIG. 8, a link member for use in a suspension link assembly is generally indicated at 11". The link member 11" may preferably be made of metal and most preferably steel. The link member 11" may have a shank portion generally indicated at 12". The shank portion 12" may include a threaded segment 14". The threaded segment 14" is for connecting the link assembly with another component in the suspension system (not shown) as is well-known. The shank portion 12" may take any suitable configuration.

The link member 11" further includes a head portion generally indicated at 16". The head portion 16" may be fixedly secured to the shank portion 12" and, may preferably be integrally formed therewith. Thus, the head portion 16" and shank portion 12" may be formed as one piece. Alternatively, the head portion 16" and shank portion 12" may be formed independently and secured together. The head portion 16" has a generally circular cross-section.

Figure 9:
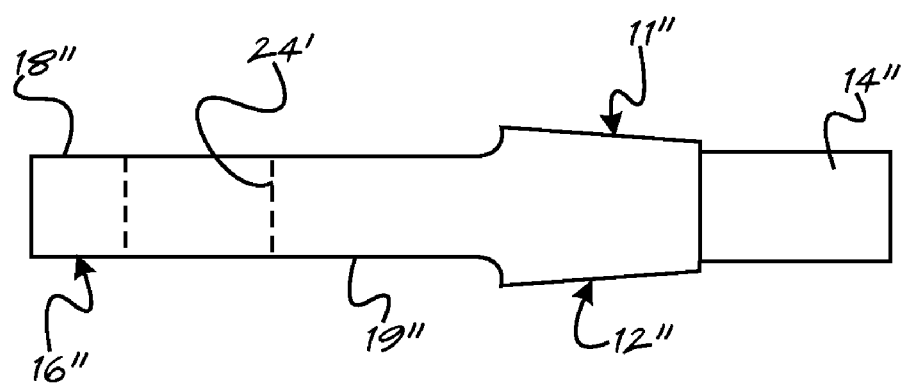
FIG. 9 is a side view of the embodiment of FIG. 8.

The head portion 16" may have an inwardly directed surface 18" (FIG. 9). The inwardly surface 18" may be generally flat. The inwardly directed surface 18' may be bounded by an annular lip (not shown).

The head portion 16" may also include a second inwardly directed surface 19" opposite to the inwardly directed surface 18". Second inwardly directed surface 19" may also be generally flat. The second inwardly directed surface 19" may be bounded by an annular lip (not shown). While the inwardly directed surfaces 18", 19" are shown to be generally flat, it will be appreciated that they can take any suitable geometric configuration. Further, while two inwardly directed surfaces 18", 19" are shown on opposite sides of the link member 11", it will be appreciated that only one inwardly directed surface 18" may be used. In such a case, the opposite side of the link member 11' can take any suitable geometric configuration.

As described in connection with the embodiment shown in FIGS. 8 and 9, the inwardly directed surfaces 18" and 19" refer to the generally flat surfaces on opposite sides of the head portion 16". Each of these surfaces 18" and 19" are shown to be tapered inwardly from the shank portion 12". It will be appreciated that these inwardly directed surfaces 18" and 19" extend directly from the shank portion 12" and not be tapered therefrom. That is, the flat inwardly directed surfaces 18" and 19" may be a continuation of the shank portion 12" without being tapered therefrom.

The head portion 16" may further include an aperture 24" extending from the inwardly directed surface 18". The aperture 24" is for allowing a throughbolt (not shown) to pass therethrough. The aperture 24" may extend between the inwardly directed surface 18" and the second inwardly directed surface 19". The aperture 24" is shown to be generally cylindrical. However, it will be appreciated that the aperture 24" may taper inwardly from one inwardly directed surface 18" to the opposite inwardly directed surface 19"

The alternate link assembly, including link member 11" may include at least one bushing (not shown). The bushing may have contoured surfaces of the type described above. Alternative to the concave and convex end surfaces as described above, the bushing may have frustoconical end surfaces. Still further, the bushings may simply be cylindrical with flat end surfaces as opposed to the concave, convex or frustoconical surfaces described above. Similarly, the bushing may be generally cylindrical, having one generally flat end surface and one contoured end surface. The body of the bushing may also have a shape other than cylindrical. It will be appreciated that both the body and ends of the bushing can have any geometric configuration within the scope of the present invention.

The link assembly may include two bushings. One bushing can be place on each side of the head portion 16" such that one bushing can contact each of the inwardly directed surfaces 18", 19".

The bushings may be elastomeric. Specifically, the bushings may comprise poured urethane. It will be appreciated that any suitable material may be used for the bushing. Other polymeric or rubber materials may be suitable. In some embodiments it is preferred that the bushings have a durometer of between about 45 and about 90 on the Shore A scale. It will be appreciated that any suitable hardness may be used. The durometer and size and shape of the bushings may be adjusted to optimize the performance of the link assembly.

The bushings may be continually preloaded by a throughbolt (not shown) to absorb and dampen various suspension impact loads. Further, by using an elastomeric bushing adjacent a metal link member 11", the design requires no lubrication and provides relatively quiet operation as compared with previous ball type linkage assemblies. The constant preload absorbs impact loads and minimized any clearance between the bushings, link member 11" and other suspension components to which the link assembly may be secured.

Using a simple throughbolt through the bushings and the link member 11" makes the link assembly easily rebuildable by simply removing the throughbolt and replacing the bushings. The throughbolt (not shown) can then be reinserted to attach the link assembly with the vehicle suspension The link assembly having the various configurations as described above may have application in a vehicle suspension system. One or more of the link assemblies can be used in connection with various suspension components. The link assembly may be attached to any vehicle component, such as by way of non-limiting example, suspension components, the vehicle frame or axles.

The foregoing description is considered illustrative only of the principles of the invention. The terminology that is used is intended to be in the nature of words of description rather than of limitation. Furthermore, because numerous modifications and changes will readily occur to those skilled in the art, it is not desired to limit the invention to the exact construction and process shown as described above. Accordingly, all suitable modifications and equivalents that may be resorted to fall within the scope of the invention as defined by the claims that follow.

What is claimed is:

1. A suspension link assembly comprising:
a link member having a shank portion and a head portion, said head portion having an inwardly directed concave surface and an aperture there through; and
at least one bushing having at least a surface to contact the inwardly directed concave surface of said head portion and having an aperture therethrough, wherein the aperture in the head portion is tapered.

2. A suspension link assembly comprising:
a link member having a shank portion and a head portion, said head portion having a concave surface, a convex surface and an aperture extending between said concave surface and said convex surface; and
at least one bushing adapted to engage at least one of said concave surface and said convex surface, said bushing having an aperture therethrough.

3. An assembly as set forth in claim 2 wherein said bushing comprises a convex surface adapted to engage said concave surface of said head portion.

4. An assembly as set forth in claim 2 wherein said bushing comprises a concave surface adapted to engage said convex surface of said head portion.

5. An assembly as set forth in claim 2 further comprising a second bushing, said at least one bushing comprising a convex surface adapted to engage said concave surface at said head portion; said second bushing comprising a concave surface adapted to engage said convex surface of said head portion.

6. An assembly as set forth in claim 2 wherein said aperture in said head portion is tapered.

7. A suspension link assembly comprising;
a bushing having a generally cylindrical body portion;
a first end surface having a generally convex portion;
a second end surface having a generally concave portion; and
an aperture extending through said cylindrical body portion from said first end surface to said second end surface.

8. An assembly as set forth in claim 7 wherein said first end surface comprises a generally flat surface intermediate the convex portion.

9. An assembly as set forth in claim 7 wherein said second end surface comprises a generally flat surface intermediate the concave portion.

10. A suspension link assembly comprising:
a link member having a shank portion and a head portion, said head portion having an inwardly directed frustoconical surface and an aperture there through; and
at least one bushing having at least a surface to contact the inwardly directed frustoconical surface of said head portion and having an aperture therethrough, wherein the aperture in the head portion is tapered.

11. An assembly as set forth in claim 10 wherein, in addition, said head portion further comprises a second inwardly directed generally frustoconical surface.

12. An assembly as set forth in claim 10 wherein said surface of said bushing is frustoconical.

13. A suspension link assembly comprising:
a link member having a shank portion and a head portion, said head portion having a flat surface and an aperture there through; and at least one bushing having at least a surface to contact the flat surface of said head portion and having an aperture therethrough, wherein the aperture in the head portion is tapered.

14. An assembly as set forth in claim 13 wherein said surface of said bushing is flat.

15. A suspension link assembly comprising:

a link member having a shank portion and a head portion, said head portion having a convex surface and an aperture there through; and at least one bushing having at least a surface to contact the convex surface of said head portion and having an aperture therethrough, wherein the aperture in the head portion is tapered.

16. An assembly as set forth in claim 15 wherein said surface of said bushing is convex.

* * * * *